(12) United States Patent
Nagaoka et al.

(10) Patent No.: US 11,207,872 B2
(45) Date of Patent: Dec. 28, 2021

(54) DECORATIVE FILM FOR FILM INSERT MOLDING AND METHOD FOR MANUFACTURING SAME

(71) Applicant: DENKA COMPANY LIMITED, Tokyo (JP)

(72) Inventors: Kouta Nagaoka, Isesaki (JP); Keiji Takano, Isesaki (JP)

(73) Assignee: Denka Company Limited, Tokyo (JP)

( * ) Notice: Subject to any disclaimer, the term of this patent is extended or adjusted under 35 U.S.C. 154(b) by 0 days.

(21) Appl. No.: 17/254,093

(22) PCT Filed: Jun. 19, 2019

(86) PCT No.: PCT/JP2019/024187
§ 371 (c)(1),
(2) Date: Dec. 18, 2020

(87) PCT Pub. No.: WO2019/244909
PCT Pub. Date: Dec. 26, 2019

(65) Prior Publication Data
US 2021/0268780 A1    Sep. 2, 2021

(30) Foreign Application Priority Data

Jun. 22, 2018   (JP) .............................. JP2018-118526

(51) Int. Cl.
*B32B 27/08*      (2006.01)
*B29C 45/14*      (2006.01)
(Continued)

(52) U.S. Cl.
CPC .......... *B32B 27/08* (2013.01); *B29C 45/1418* (2013.01); *B32B 3/30* (2013.01);
(Continued)

(58) Field of Classification Search
CPC ........... B32B 27/30; B32B 3/30; B32B 27/00; B29C 51/12; B29C 51/10; B29C 51/14
See application file for complete search history.

(56) References Cited

FOREIGN PATENT DOCUMENTS

EP        3632968 A1    4/2020
EP        3685986 A1    7/2020
(Continued)

OTHER PUBLICATIONS

European Patent Office, Extended European Search Report in EP Patent Application No. 19823061.7 dated Jun. 11, 2021.
Japan Patent Office, International Search Report in International Application No. PCT/JP2019/024187 dated Aug. 6, 2019.
(Continued)

*Primary Examiner* — Lawrence D Ferguson
(74) *Attorney, Agent, or Firm* — Leydig, Voit & Mayer Ltd.

(57) ABSTRACT

The present invention provides a decorative film for film insert molding, the decorative film having: a fluorine-based resin layer containing 100 to 80 parts by mass of a fluorine-based resin and 0 to 20 parts by mass of a methacrylic acid ester-based resin; an acrylic-based resin layer containing 50 to 0 parts by mass of a fluorine-based resin and 50 to 100 parts by mass of a methacrylic acid ester-based resin; and a decorative layer containing a thermoplastic resin, laminated therein in this order, wherein the fluorine-based resin layer has a thickness of 10 μm to 200 μm, and surface unevenness is formed on a surface of the fluorine-based resin layer, the surface being on the side that is not in contact with the acrylic-based resin layer. The present invention also provides a method for manufacturing the decorative film for film insert molding.

16 Claims, 6 Drawing Sheets

(51) Int. Cl.
  *B32B 3/30*   (2006.01)
  *B32B 27/20*  (2006.01)
  *B32B 27/30*  (2006.01)
  *B32B 37/10*  (2006.01)
  *B32B 38/06*  (2006.01)
  *B29K 627/12*   (2006.01)
  *B29L 31/30*    (2006.01)
  *B60R 13/02*    (2006.01)

(52) U.S. Cl.
  CPC ............ *B32B 27/20* (2013.01); *B32B 27/304* (2013.01); *B32B 27/308* (2013.01); *B32B 37/10* (2013.01); *B32B 38/06* (2013.01); *B29C 2045/14213* (2013.01); *B29K 2627/16* (2013.01); *B29L 2031/3008* (2013.01); *B32B 2264/1022* (2020.08); *B32B 2270/00* (2013.01); *B32B 2307/402* (2013.01); *B32B 2307/538* (2013.01); *B32B 2451/00* (2013.01); *B32B 2605/003* (2013.01); *B60R 13/02* (2013.01)

(56) References Cited

FOREIGN PATENT DOCUMENTS

| | | |
|---|---|---|
| EP | 3718770 A1 | 10/2020 |
| JP | 2001-071428 A | 3/2001 |
| JP | 2001-260169 A | 9/2001 |
| JP | 2002-080674 A | 3/2002 |
| JP | 2004-042351 A | 2/2004 |
| JP | 2010-131782 A | 6/2010 |
| JP | 2013-063537 A | 4/2013 |
| JP | 2014-061705 A | 4/2014 |
| JP | 2015-016555 A | 1/2015 |
| JP | 2015-160874 A | 9/2015 |
| JP | 2016-137612 A | 8/2016 |
| JP | 2016-203436 A | 12/2016 |
| JP | 2017-213880 A | 12/2017 |
| WO | 2019/059369 A1 | 3/2019 |

OTHER PUBLICATIONS

Japan Patent Office, Written Opinion of the International Searching Authority in International Application No. PCT/JP2019/024187 dated Aug. 6, 2019.
The International Bureau of WIPO, International Preliminary Report on Patentability in International Application No. PCT/JP2019/024187 dated Dec. 30, 2020.

DECORATIVE FILM FOR FILM INSERT MOLDING AND METHOD FOR MANUFACTURING SAME

CROSS-REFERENCE TO RELATED APPLICATIONS

This patent application is the U.S. national phase of International Application No. PCT/JP2019/024187, filed on Jun. 19, 2019, which claims the benefit of Japanese Patent Application No. 2018-118526, filed Jun. 22, 2018, the disclosures of which are incorporated herein by reference in their entireties for all purposes.

TECHNICAL FIELD

The present invention relates to a decorative film for film insert molding and a method for manufacturing the same, and more particularly, the invention relates to a decorative film for film insert molding having a surface unevenness structure and a method for manufacturing the same. Furthermore, the present invention also relates to a part for automotive interior and exterior decoration, the part including the decorative film for film insert molding. Furthermore, the present invention also relates to a molded body including a decorative film for film insert molding and a method for manufacturing the same. The present invention also relates to a laminated film used for manufacturing a decorative film for film insert molding.

BACKGROUND ART

The design property or aesthetic sense of automobiles is enhanced by providing a pattern on the surface of parts for automotive interior and exterior decoration. These parts are formed using resin compositions in many cases. Therefore, a technology for providing a pattern on the surface of a resin composition is used in order to produce the parts.

With regard to this technology, for example, a synthetic resin skin material is described in the following Patent Literature 1. This synthetic resin skin material comprises a base material layer containing a polyvinyl chloride resin and a colorant; and a skin layer including an acrylic resin-containing layer that comes into contact with one surface of the base material layer, and a fluororesin-containing layer having surface unevenness on the surface that is not in contact with the acrylic resin-containing layer.

Furthermore, a synthetic resin skin material is described in the following Patent Literature 2. This synthetic resin skin material comprises, on an adhesive layer-protective sheet having a synthetic resin base material, an adhesive layer; a base material layer containing a colorant and a synthetic resin; and a skin layer containing at least one resin selected from an acrylic resin and a fluororesin, the skin layer having surface unevenness formed on the surface that is not in contact with the base material layer, in this order. Moreover, the synthetic resin base material of the adhesive layer protective sheet is a synthetic resin base material having a softening point of from 80° C. to 150° C. and having a stretchability of 150% or higher as measured according to JIS K6734 using a tensile/compression testing machine under the conditions of a temperature of 150° C. and a tensile speed of 500 mm/min.

CITATION LIST

Patent Literature

Patent Literature 1: Japanese Unexamined Patent Publication No. 2016-137612
Patent Literature 2: Japanese Unexamined Patent Publication No. 2016-203436

SUMMARY OF INVENTION

Technical Problem

In order to produce parts for automotive interior or exterior decoration, molding methods and materials are selected according to various parts. For example, a surface on the vehicle indoor space side of the instrument panel is provided with a pattern and/or can be formed of a material having soft feeling to the touch. On the other hand, the surface on the side opposite to this vehicle indoor space side can be formed of a hard material. Several molding techniques have been proposed to produce parts formed from materials having different characteristics.

One of such molding methods is film insert molding. In order to produce a part having a surface unevenness pattern on the surface by film insert molding, a decorative film having a surface unevenness pattern provided thereon in advance is used. However, since heat is applied to the decorative film during film insert molding, the surface unevenness pattern on the surface may not be maintained. Thus, it is an object of the present invention to provide a decorative film that can satisfactorily maintain surface unevenness.

Solution to Problem

The inventors of the present invention found that a decorative film having a specific configuration can satisfactorily maintain a surface unevenness pattern.

That is, the present invention provides a decorative film for film insert molding, the decorative film having: a fluorine-based resin layer containing 100 to 80 parts by mass of a fluorine-based resin and 0 to 20 parts by mass of a methacrylic acid ester-based resin; an acrylic-based resin layer containing 50 to 0 parts by mass of a fluorine-based resin and 50 to 100 parts by mass of a methacrylic acid ester-based resin; and a decorative layer containing a thermoplastic resin, laminated therein in this order, wherein the fluorine-based resin layer has a thickness of 10 μm to 200 μm, and surface unevenness is formed on a surface of the fluorine-based resin layer, the surface being on the side that is not in contact with the acrylic-based resin layer.

According to an embodiment of the present invention, the acrylic-based resin layer may have a thickness of 10 μm to 80 μm.

According to an embodiment of the present invention, a depth of the surface unevenness may be 5 μm to 100 μm.

According to an embodiment of the present invention, a storage modulus at 140° C. of the fluorine-based resin layer is $1.0 \times 10^7$ to $1.0 \times 10^9$ dyn/cm$^2$.

According to an embodiment of the present invention, the fluorine-based resin included in the fluorine-based resin layer may be at least one fluorine-based resin selected from the group consisting of polyvinylidene fluoride, a vinylidene fluoride-propylene hexafluoride copolymer, a vinylidene fluoride-propylene hexafluoride-ethylene tetrafluoride copolymer, an ethylene-ethylene chloride trifluoride copolymer, and an ethylene-ethylene tetrafluoride copolymer.

According to an embodiment of the present invention, the acrylic-based resin layer may further contain an ultraviolet absorber, and a content of the ultraviolet absorber may be 0.1 to 10 parts by mass with respect to 100 parts by mass of the sum of the mass of the fluorine-based resin and the mass of the methacrylic acid ester-based resin included in the acrylic-based resin layer.

According to an embodiment of the present invention, the ultraviolet absorber may be a triazine-based compound or a benzotriazole-based compound.

According to an embodiment of the present invention, the thermoplastic resin included in the decorative layer may be at least one thermoplastic resin selected from the group consisting of an acrylonitrile-butadiene-styrene copolymer, a polyvinyl chloride resin, an acrylic resin, a polycarbonate resin, and a polyurethane resin.

According to an embodiment of the present invention, the decorative layer may further include a colorant.

Furthermore, the present invention also provides a part for automotive interior and exterior decoration, the part including the decorative film for film insert molding.

This part for automotive interior and exterior decoration may be an instrument panel part, a console part, or a pillar part for automotive interior decoration, or a side mirror cover or a bumper for automotive exterior decoration.

Furthermore, the present invention also provides a method for manufacturing a decorative film for film insert molding, the method including: a lamination step of laminating a fluorine-based resin layer containing 100 to 80 parts by mass of a fluorine-based resin and 0 to 20 parts by mass of a methacrylic acid ester-based resin, and an acrylic-based resin layer containing 50 to 0 parts by mass of a fluorine-based resin and 50 to 100 parts by mass of a methacrylic acid ester-based resin, by a co-extrusion method; a pressure-bonding step of pressure-bonding, with a heating roll, a decorative layer containing a thermoplastic resin to a surface of the acrylic-based resin layer of a laminate obtained in the lamination step, the surface being on the side that is not in contact with the fluorine-based resin layer; and a surface unevenness structure forming step of pressure-bonding a surface unevenness heating roll to a surface of the fluorine-based resin layer immediately after the pressure-bonding step, the surface being on the side that is not in contact with the acrylic-based resin layer, and thereby forming a surface unevenness structure on the surface.

Furthermore, the present invention also provides a molded body in which a fluorine-based resin layer containing 100 to 80 parts by mass of a fluorine-based resin and 0 to 20 parts by mass of a methacrylic acid ester-based resin; an acrylic-based resin layer containing 50 to 0 parts by mass of a fluorine-based resin and 50 to 100 parts by mass of a methacrylic acid ester-based resin; a decorative layer containing a thermoplastic resin; and a base material layer containing a thermoplastic resin are laminated in this order, the thickness of the fluorine-based resin layer is 10 to 200 μm, and surface unevenness is formed on a surface of the fluorine-based resin layer, the surface being on the side that is not in contact with the acrylic-based resin layer.

The thermoplastic resin included in the base material layer may be at least one thermoplastic resin selected from the group consisting of an acrylonitrile-butadiene-styrene copolymer, a polycarbonate resin, a polypropylene resin, an acrylic resin, a polyamide resin, and a polyurethane resin.

Furthermore, the present invention also provides a method for manufacturing a molded body, the method including: a softening step of heating a decorative film for film insert molding in a mold to soften the decorative film, the decorative film having a fluorine-based resin layer containing 100 to 80 parts by mass of a fluorine-based resin and 0 to 20 parts by mass of a methacrylic acid ester-based resin, an acrylic-based resin layer containing 50 to 0 parts by mass of a fluorine-based resin and 50 to 100 parts by mass of a methacrylic acid ester-based resin, and a decorative layer containing a thermoplastic resin, laminated therein in this order, in which the fluorine-based resin layer has a thickness of 10 to 200 μm, and surface unevenness is formed on a surface of the fluorine-based resin layer, the surface being on the side that is not in contact with the acrylic-based resin layer; a forming step of forming the decorative film that has been softened in the softening step, into a final shape under vacuum pressure or with compressed air; and an injection step of pouring a thermoplastic resin that forms a base material layer into the mold after the forming step, cooling the thermoplastic resin to solidify, and thereby obtaining a molded body in which the decorative film for film insert molding and the base material layer are integrated.

Furthermore, the present invention also provides a laminated film used for manufacturing a decorative film for film insert molding, the laminated film having a fluorine-based resin layer containing 100 to 80 parts by mass of a fluorine-based resin and 0 to 20 parts by mass of a methacrylic acid ester-based resin and an acrylic-based resin layer containing 50 to 0 parts by mass of a fluorine-based resin and 50 to 100 parts by mass of a methacrylic acid ester-based resin laminated therein, and the fluorine-based resin layer having a thickness of 10 to 200 μm, wherein during the manufacture of the decorative film, the decorative film is manufactured by pressure-bonding a decorative layer containing a thermoplastic resin to the laminated film with a heating roll, and immediately after the pressure-bonding, forming a surface unevenness structure on a surface of the fluorine-based resin layer, the surface being on the side that is not in contact with the acrylic-based resin layer, by pressure-bonding a surface unevenness heating roll to the surface.

Advantageous Effects of Invention

According to the present invention, a decorative film that can satisfactorily maintain surface unevenness during film insert molding is provided.

Incidentally, the effects of the present invention are not necessarily limited to the effects described herein and may be any effects described in the present specification.

DESCRIPTION OF EMBODIMENTS

Hereinafter, embodiments for carrying out the present invention will be described in detail. Incidentally, the embodiments that will be described below represent exemplary representative embodiments of the present invention, and the scope of the present invention cannot be limited to these examples only.

1. Decorative Film for Film Insert Molding

A decorative film for film insert molding according to the present invention includes a specific fluorine-based resin layer, a specific acrylic-based resin layer, and a specific decorative layer, and these three layers are laminated in this order. Furthermore, the thickness of the fluorine-based resin layer is 10 μm to 200 μm, and surface unevenness is formed on a surface of the fluorine-based resin layer, the surface being on the side that is not in contact with the acrylic-based resin layer.

Figure 1:
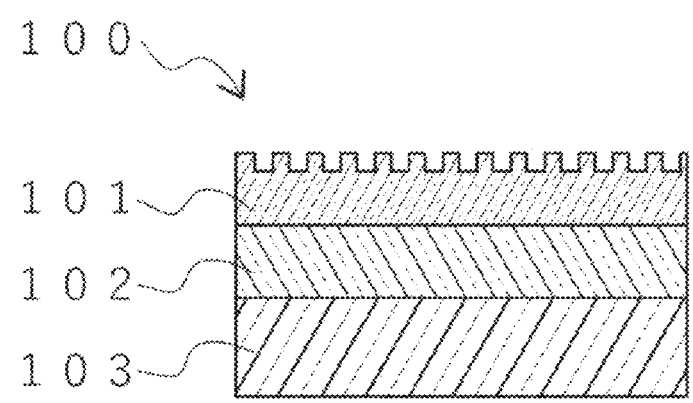
FIG. 1 is a schematic diagram illustrating an example of a decorative film according to the present invention.

A schematic diagram of an example of the decorative film for film insert molding according to the present invention is illustrated in FIG. 1. As illustrated in FIG. 1, the decorative film for film insert molding 100 according to the present invention is such that a fluorine-based resin layer 101 having surface unevenness is formed on the surface, an acrylic-based resin layer 102, and a decorative layer 103 are laminated in this order.

Film insert molding refers to a molding method of introducing a resin into a mold in a state in which a film is disposed in the mold and obtaining a molded body in which the resin is covered with the film.

A specific example of this molding method is as follows. That is, first, a shaped film is disposed in a mold. In order to shape the film, for example, this film is heated inside the mold and then is stuck to the inner surface of the mold by, for example, suction or the like. Then, next, in a state in which the film is stuck to the inner surface of the mold, a resin is injected into the mold. After this resin is cool to solidify, a molded body in which the surface of the resin is covered with the film is taken out from the mold.

As described above, the film is heated upon being shaped. Furthermore, the film is also heated by the heat of the injected resin. As such, heat is applied to the film used for the film insert molding when a molded body is produced. Therefore, in a case in which the film has surface unevenness on the surface, it is desired that even if the heat is applied, the surface unevenness is maintained.

The decorative film for film insert molding according to the present invention is such that even if the heat to be applied for film insert molding is given, the decorative film can satisfactorily maintain the surface unevenness carried by the film. Therefore, the decorative film according to the present invention is suitable for coating a molded body during film insert molding.

In the following description, the various layers constituting the decorative film according to the present invention will be explained in detail.

[Fluorine-Based Resin Layer]

The decorative film for film insert molding according to the present invention includes a fluorine-based resin layer containing 100 to 80 parts by mass of a fluorine-based resin and 0 to 20 parts by mass of a methacrylic acid ester-based resin. The fluorine-based resin layer is a layer mainly composed of resins (particularly, a fluorine-based resin). This fluorine-based resin layer may be composed only of resins or may be composed of resins and components other than a resin.

The content of the fluorine-based resin in the fluorine-based resin layer may be 100 to 80 parts by mass, preferably 95 to 80 parts by mass, and more preferably 90 to 80 parts by mass, and the content of the methacrylic acid ester-based resin in the fluorine-based resin layer may be 0 to 20 parts by mass, preferably 5 to 20 parts by mass, and more preferably 10 to 20 parts by mass.

The content of the fluorine-based resin and the content of the methacrylic acid ester-based resin are compositional proportions occupied by the fluorine-based resin and the methacrylic acid ester-based resin, respectively, with respect to 100 parts by mass of the resin components in the fluorine-based resin layer. The resin components in the fluorine-based resin layer can be composed only of the fluorine-based resin and the methacrylic acid ester-based resin. In this case, the content of the fluorine-based resin and the content of the methacrylic acid ester-based resin are the items of a breakdown of 100 parts by mass in a case in which the total content of these two resins is designated as 100 parts by mass. For example, when the content of the fluorine-based resin is 90 parts by mass, the content of the methacrylic acid ester-based resin is 10 parts by mass, and when the content of the fluorine-based resin is 80 parts by mass, the content of the methacrylic acid ester-based resin is 20 parts by mass.

Due to the contents of the fluorine-based resin and the methacrylic acid ester-based resin in the fluorine-based resin layer, the surface unevenness is satisfactorily maintained upon film insert molding. Furthermore, due to the above-described contents, for example, the chemical resistance required from automotive interior and exterior decoration is imparted to the fluorine-based resin layer.

The contents of the fluorine-based resin and the methacrylic acid ester-based resin in the fluorine-based resin layer are measured by $^1$HNMR measurement (apparatus: NMR spectrometer "AVANCE III HD NanoBay 400 MHz" manufactured by Bruker, solvent: Dimethyl sulfoxide (DMSO), measurement temperature: 70° C., cumulative number: 64 times). The contents of the fluorine-based resin and the methacrylic acid ester-based resin in the acrylic-based resin layer that will be described below are also measured by the same method.

The fluorine-based resin included in the fluorine-based resin layer may be preferably at least one fluorine-based resin selected from the group consisting of polyvinylidene fluoride, a vinylidene fluoride-propylene hexafluoride copolymer, a vinylidene fluoride-propylene hexafluoride-ethylene tetrafluoride copolymer, an ethylene-ethylene chloride trifluoride copolymer, and an ethylene-ethylene tetrafluoride copolymer. More preferably, the fluorine-based resin included in the fluorine-based resin layer includes at least polyvinylidene fluoride. According to one preferred embodiment of the present invention, the fluorine-based resin may be formed from polyvinylidene fluoride only. More preferably, the fluorine-based resin include in the fluorine-based resin layer may be preferably polyvinylidene fluoride having a melt viscosity of 10 to 25 kpoise, and more preferably polyvinylidene fluoride having a melt viscosity of 15 to 20 kpoise. As such a polyvinylidene fluoride, for example, KYNAR 1000 HD (melt viscosity 15 to 20 kpoise) may be mentioned. The melt viscosity is measured according to ASTM D3835 under the conditions of 232° C. and 100 $sec^{-1}$.

The methacrylic acid ester-based resin included in the fluorine-based resin layer is a polymer having a methacrylic acid ester monomer unit as a main component. This methacrylic acid ester-based resin may be a homopolymer of one kind of methacrylic acid ester monomer, may be a copolymer of two or more kinds of methacrylic acid ester monomers, or may be a copolymer of one kind or two or more kinds of methacrylic acid ester monomers and a vinyl compound other than a methacrylic acid ester monomer.

Examples of the methacrylic acid ester monomer include methyl methacrylate, ethyl methacrylate, propyl methacrylate, butyl methacrylate, pentyl methacrylate, and hexyl methacrylate; however, the monomers are not limited to these. Furthermore, the alkyl groups such as a propyl group, a butyl group, a pentyl group, and a hexyl group in the methacrylic acid ester monomers may be linear or branched. Examples of the vinyl compound other than the methacrylic acid ester include an acrylic acid ester, styrene, ethylene, butadiene, isoprene, α-methylstyrene, acrylonitrile, acrylic acid, and propylene; however, the vinyl compound is not limited to these. According to the present invention, the methacrylic acid ester monomer unit constituting the methacrylic acid ester-based resin may be one, two, or three selected from methyl methacrylate, ethyl methacrylate, and propyl methacrylate, and more preferably, the methacrylic acid ester monomer unit may be methyl methacrylate. According to one preferred embodiment of the present invention, the methacrylic acid ester-based resin included in the fluorine-based resin layer may be polymethyl methacrylate (PMMA). More preferably, the methacrylic acid ester-based resin included in the fluorine-based resin layer may be preferably a PMMA Having a melt viscosity of 200 to 5,000 Pa-sec, and more preferably a PMMA having a melt viscosity of 500 to 2,000 Pa-sec. Examples of such a PMMA include SUMIPEX MGSS (melt viscosity 1,050 Pa-sec). The melt viscosity is measured using CAPILOGRAPH 1D manufactured by Toyo Seiki Seisaku-sho, Ltd., under the conditions of a resin temperature of 230° C. and a shear rate of 122 $sec^{-1}$.

In a case in which a fluorine-based resin layer including the polyvinylidene fluoride having a specific melt viscosity as described above and a PMMA having a specific melt viscosity as described above, and an acrylic-based resin layer including the polyvinylidene fluoride having a specific melt viscosity and a PMMA having a specific melt viscosity, which will be described in the following [Acrylic-based resin layer], are laminated, these layers become more uniform, and/or the external appearance defect such as melt fracture can be prevented. Furthermore, the surface unevenness structure formed on the fluorine-based resin layer of a laminate of these layers is satisfactorily maintained during film insert molding.

The thickness of the fluorine-based resin layer is, for example, 10 μm to 200 μm, preferably 10 μm to 80 μm, more preferably 15 μm to 50 μm, and even more preferably 20 μm to 40 μm. In a case in which the thickness of the fluorine-based resin layer is too thin, the surface unevenness of the fluorine-based resin layer may not be satisfactorily maintained during heating. Furthermore, in a case in which the thickness of the fluorine-based resin layer is too thick, when the fluorine-based resin layer is thermally laminated with a decorative layer, it is difficult for heat to be transferred to the acrylic-based resin layer, and therefore, it may be necessary to increase the temperature of thermal lamination or to slow the line speed. That is, productivity may be deteriorated. Furthermore, in order to also suppress the production cost for film by further reducing the amount of use of the fluorine-based resin per unit area, a thickness in the above-described numerical value range is preferred.

The storage modulus at 140° C. of the fluorine-based resin layer is preferably $1.0 \times 10^7$ to $1.0 \times 10^9$ $dyn/cm^2$, and more preferably $1.0 \times 10^7$ to $5.0 \times 10^8$ $dyn/cm^2$. This storage modulus is measured using a dynamic viscoelasticity measuring apparatus, RSA-G2 (manufactured by TA Instruments Japan Inc.) under the following conditions.

Measurement mode; Dynamic measurement mode (temperature scanning)
Measurement temperature range: 23° C. to 200° C.
Rate of temperature increase: 10° C./min
Frequency: 1 Hz
Sample shape: Strip form having a size of 30 mm in length×5 mm in width, with the flow direction of the film designated as the longitudinal direction
Distance between chucks: 10 mm In a case in which the storage modulus is in the above-described numerical value range, since the heat resistance of the fluorine-based resin layer is high, an effect that the surface unevenness at the fluorine-based resin layer surface is satisfactorily maintained during film insert molding is provided.

The total content proportion of the fluorine-based resin and the methacrylic acid ester-based resin in the fluorine-based resin layer may be preferably 80% by mass or more, more preferably 85% by mass or more, and even more preferably 90% by mass or more, with respect to the mass of the fluorine-based resin layer. The fluorine-based resin layer may be composed only of the above-described two resins.

The fluorine-based resin layer can include components other than the resin components. Examples of the components other than the resin components include a plasticizer, a lubricating agent, an antistatic agent, an antifogging agent, a dropping agent, a hydrophilic agent, and a liquid repellent. The content proportions of the various components other than the resin components may be, for example, 0.001 parts by mass to 20 parts by mass, preferably 0.01 parts by mass to 10 parts by mass, and more preferably 0.1 parts by mass to 3 parts by mass, in a case in which the total amount of the fluorine-based resin and the methacrylic acid ester-based resin is 100 parts by mass. The fluorine-based resin layer may include a pigment. However, in the case of using a titanium-based pigment as the pigment, the fluorine-based resin layer may have a white color tone. Therefore, the fluorine-based resin layer may not include a titanium-based pigment.

The fluorine-based resin layer has surface unevenness formed on a surface on the side that is not in contact with the acrylic-based resin layer.

The depth of the surface unevenness is preferably 5 μm to 100 μm, more preferably 8 μm to 50 pin, even more preferably 10 μm to 30 μm, and still more preferably 12 μm to 28 μm. The decorative film of the present invention is especially suitable for maintaining surface unevenness having such a depth.

Furthermore, the width of the surface unevenness is preferably 10 μm to 300 μm, more preferably 50 μm to 200 μm, and even more preferably 75 μm to 150 μm.

Furthermore, this surface unevenness may preferably include linear (for example, straight line-shaped or curved) grooves having the above-described depth and the above-described width. More preferably, this surface unevenness may be a surface unevenness structure in which the grooves are disposed at an interval of, for example, 10 μm to 300 μm, preferably 30 μm to 200 μm, and more preferably 40 μm to 150 μm (more preferably, at an equal interval).

The decorative film of the present invention is especially suitable for maintaining such a surface unevenness structure on the surface of the decorative film during film insert molding.

The fluorine-based resin layer is preferably transparent, and more preferably, the fluorine-based resin layer has transparency that enables visible recognition of the decorative layer. Thereby, the color or pattern of the decorative layer can be presented to users.

[Acrylic-Based Resin Layer]

The decorative film for film insert molding according to the present invention includes an acrylic-based resin layer containing 50 to 0 parts by mass of a fluorine-based resin and 50 to 100 parts by mass of a methacrylic acid ester-based resin. The acrylic-based resin layer is a layer mainly composed of resins (particularly, a methacrylic acid ester-based resin). This acrylic-based resin layer may be composed only of resins or may be composed of resins and components other than a resin.

The content of the fluorine-based resin in the acrylic-based resin layer may be 50 to 0 parts by mass, preferably 40 to 5 parts by mass, and more preferably 30 to 10 parts by mass, and the content of the methacrylic acid ester-based resin in the fluorine-based resin layer may be 50 to 100 parts by mass, preferably 60 to 95 parts by mass, and more preferably 70 to 90 parts by mass. Due to the above-described contents of the fluorine-based resin and the methacrylic acid ester-based resin in the acrylic-based resin layer, an effect that the adhesive strength to the fluorine-based resin layer is enhanced is obtained.

The content of the fluorine-based resin and the content of the methacrylic acid ester-based resin are compositional proportions occupied by the fluorine-based resin and the methacrylic acid ester-based resin, respectively, in 100 parts by mass of the resin components in the acrylic-based resin layer. The resin components in the acrylic-based resin layer are composed only of the fluorine-based resin and the methacrylic acid ester-based resin. In this case, the content of the fluorine-based resin and the content of the methacrylic acid ester-based resin are the items of a breakdown of 100 parts by mass in a case in which the total content of these two resins is designated as 100 parts by mass. For example, when the content of the fluorine-based resin is 10 parts by mass, the content of the methacrylic acid ester-based resin is 90 parts by mass, and when the content of the fluorine-based resin is 20 parts by mass, the content of the methacrylic acid ester-based resin is 80 parts by mass.

The fluorine-based resin included in the acrylic-based resin layer may be preferably at least one fluorine-based resin selected from the group consisting of polyvinylidene fluoride, a vinylidene fluoride-propylene hexafluoride copolymer, a vinylidene fluoride-propylene hexafluoride-ethylene tetrafluoride copolymer, an ethylene-ethylene chloride trifluoride copolymer, and an ethylene-ethylene tetrafluoride copolymer. More preferably, the fluorine-based resin included in the acrylic-based resin layer includes at least polyvinylidene fluoride. According to one preferred embodiment of the present invention, this fluorine-based resin may be composed only of polyvinylidene fluoride.

According to one more preferred embodiment of the present invention, the fluorine-based resin included in the fluorine-based resin layer includes: (a) a polyvinylidene fluoride having a melt viscosity of 13 to 25 kpoise, and more preferably a melt viscosity of 15 to 23 kpoise; and (b) a polyvinylidene fluoride having a melt viscosity of 4 to 13 kpoise, and more preferably a melt viscosity of 6 to 12 kpoise, and even more preferably, the fluorine-based resin is composed only of polyvinylidene fluorides of these (a) and (b). As the polyvinylidene fluoride of (a), for example, KYNAR 1000 HD (melt viscosity 15 to 20 kpoise) and KYNAR K741 (melt viscosity 15 to 23 kpoise) may be mentioned. As the polyvinylidene fluoride of (b), for example, KYNAR K720 (melt viscosity 6 to 12 kpoise) may be mentioned. The melt viscosity is measured according to ASTM D3835 under the conditions of 232° C. and 100 $sec^{-1}$. The mass ratio of the contents of the polyvinylidene fluoride of (a) and the polyvinylidene fluoride of (b) may be preferably 30:70 to 70:30, and more preferably 40:60 to 60:40.

The methacrylic acid ester-based resin included in the acrylic-based resin layer is a polymer having a methacrylic acid ester monomer unit as a main component. This methacrylic acid ester-based resin may be a homopolymer of one kind of methacrylic acid ester monomer, may be a copolymer of two or more kinds of methacrylic acid ester monomers, or may be a copolymer of one kind or two or more kinds of methacrylic acid ester monomers and a vinyl compound other than a methacrylic acid ester monomer. Examples of the methacrylic acid ester monomer include methyl methacrylate, ethyl methacrylate, propyl methacrylate, butyl methacrylate, pentyl methacrylate, and hexyl methacrylate; however, the methacrylic acid ester monomer is not limited to these. Furthermore, the alkyl groups such as a propyl group, a butyl group, a pentyl group, and a hexyl group of the methacrylic acid ester monomers may be linear or may be branched. Examples of the vinyl compound other than the methacrylic acid ester include an acrylic acid ester, styrene, ethylene, butadiene, isoprene, α-methylstyrene, acrylonitrile, acrylic acid, and propylene; however, the vinyl compound is not limited to these. According to the present invention, the methacrylic acid ester monomer unit that constitutes the methacrylic acid ester-based resin is preferably one, two, or three selected from methyl methacrylate, ethyl methacrylate, and propyl methacrylate, and more preferably, the methacrylic acid ester monomer unit may be methyl methacrylate. According to one preferred embodiment of the present invention, the methacrylic acid ester-based resin included in the acrylic-based resin layer may be polymethyl methacrylate (PMMA). More preferably, the methacrylic acid ester-based resin included in the acrylic-based resin layer may be preferably a PMMA having a melt viscosity of 200 to 3,000 Pa·sec, and more preferably a PMMA having a melt viscosity of 500 to 2,000 Pa·sec. Examples of such a PMMA include HIPET HBS000 (melt viscosity 1,378 Pa·sec). The melt viscosity is measured using CAPILOGRAPH 1D manufactured by Toyo Seiki Seisaku-sho, Ltd., under the conditions of a resin temperature of 240° C. and a shear rate of 122 $sec^{-1}$.

The thickness of the acrylic-based resin layer is, for example, 10 μm to 80 μm, preferably 10 μm to 80 μm, more preferably 12 μm to 50 μm, and even more preferably 14 μm to 40 μm. When the thickness of the acrylic-based resin layer is in the above-described numerical value range, the surface unevenness formed on the surface of the fluorine-based resin layer can be more satisfactorily maintained.

The total content proportion of the fluorine-based resin and the methacrylic acid ester-based resin in the acrylic-based resin layer may be preferably 80% by mass or more, more preferably 85% by mass or more, and even more preferably 90% by mass or more, with respect to the mass of the acrylic-based resin layer.

The acrylic-based resin layer can include components other than the resin components. Examples of the components other than the resin components include an ultraviolet absorber, a plasticizer, a lubricating agent, an antistatic agent, an antifogging agent, a dropping agent, a hydrophilic agent, and a liquid repellent. The content proportions of the various components other than the resin components may be, for example, 0.001 parts by mass to 20 parts by mass, preferably 0.01 parts by mass to 20 parts by mass, and more preferably 0.1 parts by mass to 3 parts by mass, when the total amount of the fluorine-based resin and the methacrylic acid ester-based resin is designated as 100 parts by mass.

The acrylic-based resin layer is preferably transparent, and more preferably, the acrylic-based resin layer has transparency that enables visible recognition of the decorative layer. Thereby, the color or pattern of the decorative layer can be presented to users.

According to one preferred embodiment of the present invention, the acrylic-based resin layer can include an ultraviolet absorber. Examples of the ultraviolet absorber include organic ultraviolet absorbers such as a triazine-based compound, a benzotriazole-based compound, and a benzophenone-based compound; however, the ultraviolet absorber is not limited to these.

The ultraviolet absorber included in the acrylic-based resin layer is preferably one or more kinds selected from a triazine-based compound and a benzotriazole-based compound. These compounds are excellent in terms of the long-term color stability against a hot humid environment and ultraviolet radiation, the compatibility with vinylidene fluoride-based resins, or an ultraviolet blocking effect.

Examples of the triazine-based compound include 2-(4, 6-diphenyl-1,3,5-triazin-2-yl)-5-[2-(2-ethylhexanoyloxy) ethoxy]phenol, 2-(4,6-diphenyl-1,3,5-triazin-2-yl)-5-[(hexyl)oxy]phenol, 2-(4,6-diphenyl-1,3,5-triazin-2-yl)-5-[(hexyl)oxy]-phenol, 2-[4-[(2-hydroxy-3-dodecyloxypropyl)oxy]-2-hydroxyphenyl]-4,6-bis(2,4-dimethylphenyl)-1,3,5-triazine, 2-[4-[(2-hydroxy-3-tridecyloxypropyl)oxy]-2-hydroxyphenyl]-4,6-bis(2, 4dimethylphenyl)-1,3,5-triazine, and 2,4-bis(2,4-dimethylphenyl)-6-(2-hydroxy-4-iso-octyloxyphenyl)-s-triazine, and modification products, polymerization products, and derivatives of these. The ultraviolet absorber used for the present invention may be one of these compounds or may be a combination of two or more. According to one preferred embodiment of the present invention, the acrylic-based resin layer includes 2-(4,6-diphenyl-1,3,5-triazin-2-yl)-5-(hexyloxy)-phenol as the ultraviolet absorber.

Examples of the benzotriazole-based compound include 2-(2'-hydroxy-3'-tert-butyl-5'-methylphenyl)-5-chlorobenzotriazole, 2-(2H-benzotriazol-2-yl)-4,6-bis(1-methyl-1-phenylethyl)phenol, 2-(5'-methyl-2'-hydroxyphenyl)benzotriazole, 2-(5'-t-butyl-2'-hydroxyphenyl)benzotriazole, 2-[2'-hydroxy-3',5'-bis(α,α-dimethylbenzyl)phenyl]benzotriazole, 2-(3',5'-di-t-butyl-2'-hydroxyphenyl)benzotriazole, 2-(3'-t-butyl-5'-methyl-2'-hydroxyphenyl)-5-chlorobenzotriazole, 2-(3',5'-di-t-butyl-2'-hydroxyphenyl)-5-chlorobenzotriazole, 2-(3',5'-di-t-amyl-2'-hydroxyphenyl)benzotriazole, 2-[3'-(3",4",5",6"-tetrahydrophthalimidomethyl)-5'-methyl-2'-hydroxyphenyl]benzotriazole, 2,2'-methylenebis[4-(1,1,3,3-tetramethylbutyl)-6-(2H-benzotriazol-2-yl) phenol], and modification products, polymerization products, and derivatives of these. The ultraviolet absorber used for the present invention may be one of these compounds, or two or more of these may be used in combination. According to one preferred embodiment of the present invention, the acrylic-based resin layer includes 2-(2H-benzotriazol-2-yl)-4,6-bis(l-methyl-1-phenylethyl)phenol as an ultraviolet absorber.

The content of the ultraviolet absorber is preferably 0.1 to 10 parts by mass, more preferably 0.5 parts by mass to 8 parts by mass, and even more preferably 1 part by mass to 5 parts by mass, with respect to 100 parts by mass of the resin components (particularly, 100 parts by mass of the total amount of the fluorine-based resin and the methacrylic acid ester-based resin). As the amount of the ultraviolet absorber is more than or equal to the lower limit value of the above-described numerical value range, sufficient ultraviolet cutting performance is obtained, and/or weather resistance can be enhanced. Furthermore, as the amount of the ultraviolet absorber is less than or equal to the upper limit value of the above-described numerical value range, the ultraviolet absorber can be prevented from bleeding out to the surface of the back face layer, and/or deterioration of the tight adhesiveness to the fluorine-based resin layer or the decorative layer can be prevented. Furthermore, as the amount of the ultraviolet absorber is less than or equal to the upper limit value of the above-described numerical value range, transparency of the acrylic-based resin layer can be increased, visibility of the decorative layer can be increased, and/or deterioration of the color tone of the decorative layer can be suppressed.

[Decorative Layer]

The decorative film for film insert molding according to the present invention includes a decorative layer containing a thermoplastic resin. This thermoplastic resin may be, for example, at least one thermoplastic resin selected from the group consisting of an acrylonitrile-butadiene-styrene copolymer, a polyvinyl chloride resin, an acrylic resin, a polycarbonate resin, and a polyurethane resin.

The decorative layer is preferably a resin film containing the above-described thermoplastic resin as a main component. The thickness of this resin film may be preferably 50 μm to 500 μm, and more preferably 100 μm to 300 μm. By having such a thickness, a design property is easily imparted to the decorative layer.

The decorative layer may be provided with, for example, design such as coloration, printing, or graining. According to one preferred embodiment of the present invention, the decorative layer can further include a colorant. Thereby, the decorative layer is colored. The colorant may be appropriately selected by a person having ordinary skill in the art according to a desired design. Examples of the colorant include titanium oxide. It is preferable that the content of the colorant is preferably 10 parts by mass to 40 parts by mass, more preferably 15 parts by mass to 30 parts by mass, and even more preferably 20 parts by mass to 25 parts by mass, with respect to 100 parts by mass of the resin components of the decorative layer (particularly, 100 parts by mass of the thermoplastic resin).

[Method for Manufacturing Decorative Film]

The decorative film for film insert molding according to the present invention may be produced by, for example, the manufacturing method that will be described in the following section "2. Method for manufacturing decorative film for film insert molding".

[Use Application of Decorative Film]

The decorative film according to the present invention may be used for film insert molding and may be used, for example, in film insert molding for producing parts for automotive interior and exterior decoration. That is, the present invention also provides a part for automotive interior and exterior decoration, the part including the decorative film for film insert molding according to the present invention. This part for automotive interior and exterior decoration is, for example, an instrument panel part, a console part, or a pillar part for automotive interior decoration; or a side mirror cover or a bumper for automotive exterior decoration; however, the part for automotive interior and exterior decoration is not limited to these.

2. Method for Manufacturing Decorative Film for Film Insert Molding

The present invention provides a method for manufacturing a decorative film for film insert molding. By using the method for manufacturing a decorative film according to the present invention, a decorative film for film insert molding that can satisfactorily maintain the surface unevenness of the film surface during film insert molding can be produced. In the following description, the various steps included in the method for manufacturing a decorative film according to the present invention will be explained.

The manufacturing method according to the present invention includes a lamination step of laminating a fluorine-based resin layer containing 100 to 80 parts by mass of a fluorine-based resin and 0 to 20 parts by mass of a methacrylic acid ester-based resin, and an acrylic-based resin layer containing 50 to 0 parts by mass of a fluorine-based resin and 50 to 100 parts by mass of a methacrylic acid ester-based resin, by a co-extrusion method.

The fluorine-based resin layer and the acrylic-based resin layer used in the lamination step are as described above in the above-described section "1. Decorative film for film insert molding". In this lamination step, these resin layers are laminated by a co-extrusion method. As the co-extrusion method, techniques already known to those skilled in the art may be used. In the co-extrusion method, for example, a resin that forms the fluorine-based resin layer and a resin that forms the acrylic-based resin layer are extruded from respectively different extruders to form films, and two films can be laminated almost simultaneously with film formation.

The manufacturing method according to the present invention includes a pressure-bonding step of pressure-bonding, with a heating roll, a decorative layer containing a thermoplastic resin to a surface of the acrylic-based resin layer of a laminate obtained in the above-described lamination step, the surface being on the side that is not in contact with the fluorine-based resin layer.

The decorative layer used in the pressure-bonding step is as described above in the above-described section "1. Decorative film for film insert molding". This pressure-bonding is carried out by a heating roll. By using a heating roll, the laminate and the decorative layer are pressure-bonded, and at the same time, the laminate is heated. As the laminate is heated, surface unevenness formation can be carried out more efficiently in the subsequent surface unevenness structure forming step. Regarding the heating roll, any apparatus already known to those skilled in the art may be used.

Figure 2:
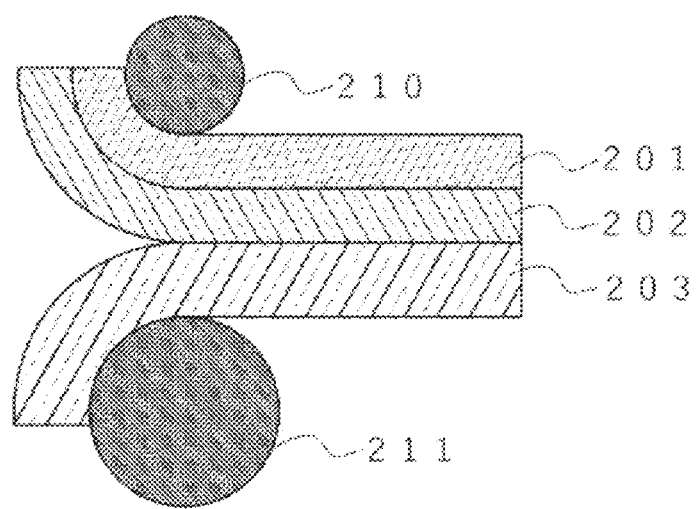
FIG. 2 is a diagram illustrating an example of a pressure-bonding step in a method for manufacturing a decorative film according to the present invention.

An example of the pressure-bonding step is illustrated in FIG. 2. As illustrated in FIG. 2, a laminate of a fluorine-based resin layer 201 and an acrylic-based resin layer 202, and a decorative layer 203 are pressure-bonded by heating rolls 210 and 211.

The manufacturing method according to the present invention includes a surface unevenness structure forming step in which, immediately after the pressure-bonding step, a surface unevenness heating roll is pressure-bonded to a surface of the fluorine-based resin layer, the surface being on the side that is not in contact with the acrylic-based resin layer, and thereby a surface unevenness structure is formed on that surface. As this surface unevenness structure is formed on the surface, the decorative film according to the present invention is obtained.

The surface unevenness heating roll used in the surface unevenness structure forming step has, on the surface of the heating roll, a surface unevenness corresponding to the surface unevenness to be formed on a surface of the fluorine-based resin layer, the surface being on the side that is not in contact with the acrylic-based resin layer. The surface unevenness of the heating roll surface may be appropriately selected by those skilled in the art, according to the surface unevenness to be formed on the surface. The depth of the surface unevenness of the heating roll surface can be preferably 10 µm to 30 µm, and more preferably 12 µm to 28 µm. As the surface unevenness heating roll, apparatuses already known to those skilled in the art may be used.

Figure 3:
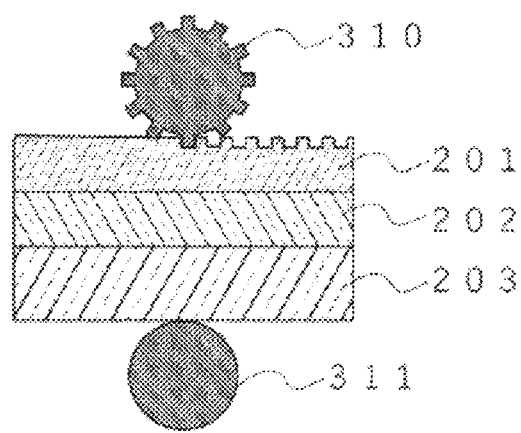
FIG. 3 is a diagram illustrating an example of a surface unevenness structure forming step in the method for manufacturing a decorative film according to the present invention.

An example of the surface unevenness structure forming step is illustrated in FIG. 3. As illustrated in FIG. 3, a laminate of a fluorine-based resin layer 201, an acrylic-based resin layer 202, and a decorative layer 203 obtained in the above-described pressure-bonding step is treated by heating rolls 310 and 311. The heating roll 310 has surface unevenness on the surface. Therefore, surface unevenness is formed on the surface of the fluorine-based resin layer 201 by this treatment.

Figure 6:
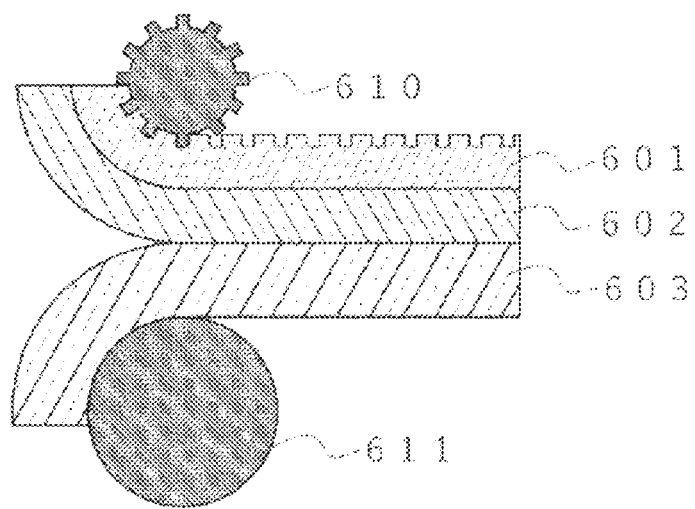
FIG. 6 is a diagram illustrating an example of a case in which a pressure-bonding step and the surface unevenness structure forming step are carried out simultaneously in the method for manufacturing a decorative film according to the present invention.

In the manufacturing method of the present invention, the pressure-bonding step and the surface unevenness structure forming step may be carried out simultaneously. An example of a case in which the pressure-bonding step and the surface unevenness structure forming step are carried out simultaneously is illustrated in FIG. 6. As illustrated in FIG. 6, a laminate of a fluorine-based resin layer 601 and an acrylic-based resin layer 602, and a decorative layer 603 are laminated and emboss-treated by a pair of heating rolls, in which one roll is a surface unevenness roll 610 having a surface unevenness structure, while the other roll is a roll 611 that does not have a surface unevenness structure. The fluorine-based resin layer 601 is brought into contact with the surface unevenness roll 610, and thereby a surface unevenness structure is formed. By using such a pair of heating rolls, the pressure-bonding step and the surface unevenness structure forming step can be carried out simultaneously.

3. Molded Body

The present invention provides a molded body in which the above-described fluorine-based resin layer, the above-described acrylic-based resin layer, the above-described decorative layer, and a base material layer containing a thermoplastic resin are laminated in this order. That is, this molded body is a molded body in which the surface of the base material layer is coated with the decorative film according to the present invention.

Figure 4:
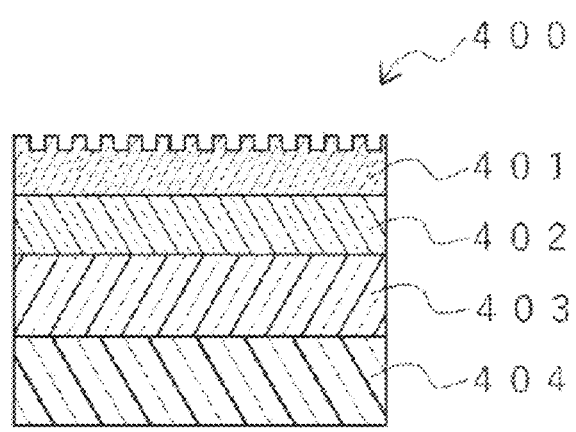
FIG. 4 is a schematic diagram illustrating an example of a molded body according to the present invention.

A schematic diagram of the molded body according to the present invention is illustrated in FIG. 4. As illustrated in FIG. 4, the molded body 400 according to the present invention has a fluorine-based resin layer 401 having surface unevenness formed on the surface, an acrylic-based resin layer 402, a decorative layer 403, and a base material layer 404 laminated therein in this order.

The fluorine-based resin layer, the acrylic-based resin layer, and the decorative layer constituting the molded body are as described in the above-described section "1. Decorative film for film insert molding".

The molded body includes a base material layer containing a thermoplastic resin. This thermoplastic resin may be a resin injected into a mold during film insert molding. This thermoplastic resin may be at least one thermoplastic resin selected from the group consisting of an acrylonitrile-butadiene-styrene copolymer, a polycarbonate resin, a polypropylene resin, an acrylic resin, a polyamide resin, and a polyurethane resin.

The molded body can be produced by, for example, performing film insert molding using the decorative film for film insert according to the present invention. More specifically, the molded body can be produced by the manufacturing method that will be described in the following "4. Method for manufacturing molded body".

4. Method for Manufacturing Molded Body

The present invention provides a method for manufacturing a molded body. This molded body is as described in, for example, the above-described section "3. Molded body".

The method for manufacturing a molded body according to the present invention includes a softening step of heating a decorative film for film insert molding in a mold to soften the decorative film, the decorative film having: a fluorine-based resin layer containing 100 to 80 parts by mass of a fluorine-based resin and 0 to 20 parts by mass of a methacrylic acid ester-based resin; an acrylic-based resin layer containing 50 to 0 parts by mass of a fluorine-based resin and 50 to 100 parts by mass of a methacrylic acid ester-based resin; and a decorative layer containing a thermoplastic resin, laminated therein in this order, in which the thickness of the fluorine-based resin layer is 10 to 200 pun, and surface unevenness is formed on a surface of the fluorine-based resin layer, the surface being on the side that is not in contact with the acrylic-based resin layer. That is, in this softening step, the decorative film for film insert molding according to the present invention is softened by heating the decorative film in a mold.

The decorative film for film insert molding used in the softening step and the various layers constituting this film are as described in the above-described section "1. Decorative film for film insert molding". The mold used in the softening step may be appropriately produced or prepared by those skilled in the art according to the desired shape of the molded body.

During the softening step, in order to soften the decorative film, this decorative film is heated to, for example, 100° C. to 160° C., preferably 110° C. to 150° C., and more preferably 120° C. to 140° C.

The method for manufacturing a molded body according to the present invention includes a forming step of forming the film that has been softened in the softening step into a final shape under vacuum pressure or with compressed air. The softened film sticks to the inner surface of the mold by this forming step.

The method for manufacturing a molded body according to the present invention includes, after the forming step, an injection step of pouring a thermoplastic resin that forms a base material layer into the mold, cooling the resin to solidify, and obtaining a molded body in which the decorative film for film insert molding and the base material layer are integrated.

The thermoplastic resin used in the injection step is as described in the above-described section "3. Molded body". This thermoplastic is poured into a mold by, for example, injecting.

Figure 5:
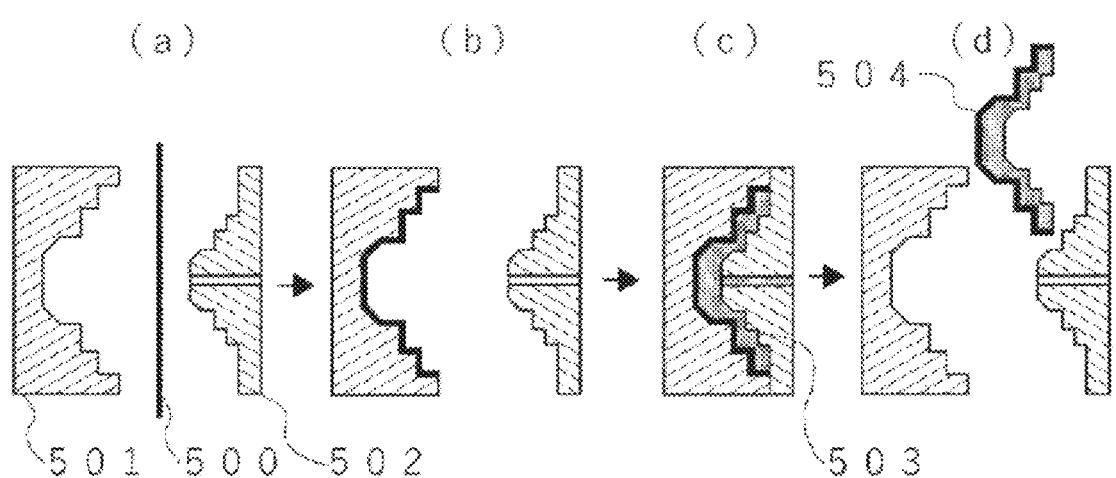
FIG. 5 is a diagram illustrating an example of a method for manufacturing a molded body according to the present invention.

An example of the method for manufacturing a molded body according to the present invention is illustrated in FIG. 5. As illustrated in FIG. 5(a), a decorative film 500 according to the present invention is inserted between a mold 501 and 502. Then, the decorative film 500 is heated and softened. After this softening, as illustrated in FIG. 5(b), the decorative film 500 is shaped by, for example, sticking to the inner surface of the mold 501 by suctioning. After this shaping, as illustrated in FIG. 5(c), a resin 503 that forms a base material layer is injected into the mold. After this injection, when the resin is solidified, as illustrated in FIG. 5(d), a molded body 504 covered with the decorative film 500 is obtained.

5. Laminated Film Used for Manufacturing Decorative Film for Film Insert Molding The present invention provides a laminated film used for manufacturing a decorative film for film insert molding. By using the laminated film according to the present invention, a decorative film that can satisfactorily maintain surface unevenness during film insert molding can be produced.

This laminated film is a laminate of a fluorine-based resin layer and an acrylic-based resin layer as described in the above-described section "1. Decorative film for film insert molding". The method for manufacturing the decorative film for film insert molding using this laminated film is as described in the above-described section "2. Method for manufacturing decorative film for film insert molding".

EXAMPLES

Hereinafter, the present invention will be described in more detail based on Examples. Incidentally, the Examples described below show representative embodiments of Examples of the present invention, and the scope of the present invention is not intended to be limited to these Examples.

<Raw Materials>
(Fluorine-Based Resin)
Polyvinylidene fluoride Kynar "1000HD" manufactured by Arkema S.A.
Polyvinylidene fluoride Kynar "K720" manufactured by Arkema S.A.
Polyvinylidene fluoride Kynar "K741" manufactured by Arkema S.A.
(Methacrylic Acid Ester-Based Resin)
Polymethyl methacrylate (PMMA) SUMIPEX "MGSS" manufactured by SUMITOMO CHEMICAL COMPANY, LIMITED
Methacrylic acid ester-based resin HIPET "HBS000" manufactured by Mitsubishi Chemical Corporation
(Ultraviolet Absorber)
Triazine-based ultraviolet absorber "TINUVIN 1577ED" manufactured by BASF SE
Benzotriazole-based ultraviolet absorber "TINUVIN 234" manufactured by BASF SE
(PVC Resin)
Polyvinyl chloride (PVC) S1008C manufactured by KANEKA CORPORATION
(Titanium Oxide)
Titanium oxide D101 manufactured by DuPont <Compounding Step>
In the case of using two or more kinds of raw materials as a mixture, the respective raw materials were preliminarily mixed in an unmelted state, and then the mixture was melted in a melt mixing facility and mixed uniformly. Subsequently, the mixture was extruded into a strand form, cooled, and then cut into a pellet form, and the resultant was used as a raw material.

<Melt Mixing Facility>
"KTX30" twin-screw extruder (screw length (L [mm])/screw diameter (D [mm])=46.8) manufactured by Kobe Steel, Ltd.
Screw kneading unit configuration . . . Provided with a VCMT kneading unit and a kneading unit in C5-C8 process unit in the cylinder
Screen mesh . . . A screen obtained by stacking three sheets of screens having mesh aperture of 0.25 mm, 0.075 mm, and 0.25 mm, respectively, from the screw side was used.

<Lamination Step>
In the lamination step, a fluorine-based resin layer and an acrylic-based resin layer were laminated, and a laminate was obtained. Specifically, the lamination step was carried out as follows. That is, the raw material obtained by the compounding step was sufficiently melted in the following extruder, subsequently the resins from the respective extruders were laminated within a feed block, and the resulting laminate was broadened inside a coat hanger type T-die and extruded into a film form. The film-like resin was obtained by discharging the resin downward, and then immediately cooling the resin while drawing in a state of being interposed between a temperature-regulated hard chrome plated roll (arithmetic mean roughness of surface, Ra=0.2 μm) and a white mirror roll.

At this time, the draft ratio, which is defined as a value obtained by dividing the lip opening representing the width of the lip gap of the T-die by the film thickness, was adjusted to 15.

Here, the surface temperature of a first cooling roll, by which the resin extruded from the T-die comes into contact and is cooled, was set to 50° C.

Furthermore, the draw ratio, which is defined as a value obtained by dividing the winding speed of the film by the speed of rotation of the first cooling roll, was set to 1.1.

<Extruder a (Front Surface Layer Side in Multilayer Configuration)>
Single-screw extruder (L/D=25) of TANABE PLASTICS MACHINERY CO., LTD.
Screw type: Full flight screw <Extruder B (Back Surface Layer Side in Multilayer Configuration)>
Single-screw extruder (L/D=25) manufactured by Research Laboratory of Plastics Technology Co., Ltd.
Screw type: Full flight screw <T-Die>
Coat hanger type manufactured by Sun Engineering Co., Ltd., width: 550 mm, lip opening: 0.5 mm <Pressure-Bonding Step and Surface Unevenness Structure Forming Step>
A decorative layer formed of a PVC resin [S1008 (trade name), KANEKA CORPORATION] and titanium oxide [D101 (trade name), DuPont] was brought into contact with the acrylic-based resin layer side of the above-mentioned laminate of a fluorine-based resin layer and an acrylic-based resin layer, the fluorine-based resin layer side was brought into contact with a surface unevenness roll using a pair of embossing rolls, with one of the embossing rolls being a surface unevenness roll having a surface unevenness structure, to perform laminate embossing. Thus, a decorative film for film insert molding having a surface unevenness structure on the surface of the fluorine-based resin layer was formed. The surface unevenness structure thus formed has linear grooves, each having a depth of 20 μm and a width of 100 μm, at equal intervals at an interval of 50 μm. The temperature conditions for laminate embossing were such that the surface temperature of the fluorine-based resin layer was 170° C., and the speed was 5 m/min.

Examples and Comparative Examples

Decorative films having the respective compositions of Examples 1 to 8 and Comparative Examples 1 to 3 as shown in the following Tables 1 and 2 were produced according to the above-mentioned manufacturing method. Incidentally, the unit (PHR) of the numerical values presented in the tables in relation to the ultraviolet absorber and titanium oxide is parts by mass per 100 parts by mass of the resin components. The thicknesses of the various layers of the produced decorative film, and the storage modulus at 140° C. in the case of having a fluorine-based resin layer only are also presented in the following Tables 1 and 2.

For the decorative films thus produced, the following evaluations were carried out. The evaluation results are also presented in the following Tables 1 and 2.

<Evaluation of Heat Resistance of Surface Unevenness>
In an oven (FineOven DH610, manufactured by Yamato Scientific Co., Ltd.), the produced decorative film was heated for 2 minutes under the conditions of a temperature in the chamber of 130° C., such that the surface temperature reached 130° C., and was cooled and solidified, and then the groove depth was measured by observation of a cross-section by a laser microscope.

<Evaluation of Lamination Strength Between Acrylic-Based Resin Layer and Decorative Layer>
Separately from the decorative film produced as described above, samples for lamination strength evaluation were produced by stacking a decorative layer including polyvinyl chloride on the acrylic-based resin layer side of a laminated film composed of a fluorine-based resin layer and an acrylic-based resin layer having the composition and thickness of each of Examples 1 to 8 and Comparative Examples 1 to 3 as indicated in the following Tables 1 and 2, placing the laminated film between a metal roll having a surface temperature of 140° C. and a rubber roll, and thermally laminating the laminated film at a rate of 1 m/min. This sample was cut into a strip form having a width of 15 mm and a length of 80 mm. A 20-mm portion of an end in the longitudinal direction of the strip-shaped sample was peeled off, the laminated film was interposed between the upper chucks of STROGRAPH VE1D (manufactured by Toyo Seiki Seisaku-sho, Ltd.), while the decorative layer was interposed between the lower chucks, and the load between the chucks at the time of peeling the sample at a rate of 200 mm/min was measured. Incidentally, the average value of the load between the chucks at a peeling distance of 10 to 30 mm was calculated as the peel strength (lamination strength).

<Evaluation of Change in Glossiness of Surface on Fluorine-Based Resin Layer Side of Decorative Film>
The change in glossiness in the case of irradiating the fluorine-based resin layer side of a decorative film with ultraviolet radiation was evaluated. This irradiation was carried out using a metal weather ultraviolet irradiation tester (manufactured by DAIPLA WINTES CO., LTD.). The irradiation conditions were as follows.
Irradiation intensity: 132 mW/cm$^2$
Ultraviolet-irradiated surface: Surface layer black panel temperature 63° C.
Humidity: 50% Rh
Irradiation/dew condensation cycle=6 hours/2 hours The 60° glossiness on the fluorine-based resin layer side of a sample before and after irradiation was measured using a handy type gloss meter, PG-IIM (manufactured by NIPPON DENSHOKU INDUSTRIES CO., LTD.), and a change in the glossiness before and after irradiation was obtained.

<Evaluation of Change in Yellowness of Decorative Film>
The change in yellowness in the case of irradiating the fluorine-based resin layer side of a decorative film with ultraviolet radiation was evaluated. This irradiation was carried out using a metal weather ultraviolet irradiation tester (manufactured by DAIPLA WINTES CO., LTD.). The irradiation conditions were as follows.
Irradiation intensity: 132 mW/cm$^2$
Ultraviolet-irradiated surface: Surface layer black panel temperature 63° C.

Humidity: 50% Rh
Irradiation/dew condensation cycle=6 hours/2 hours

The color on the fluorine-based resin layer side of a sample before and after irradiation was measured using a spectral color difference meter (color difference meter Color Meter ZE6000, manufactured by NIPPON DENSHOKU INDUSTRIES CO., LTD.), and a change Δb in the yellowness on the fluorine-based resin layer side was obtained.

<Evaluation of Antifouling Property>

The antifouling property on the fluorine-based resin layer side of a decorative film was evaluated according to the following antifouling material type I test.

(1) The lightness ($L_0$) before the test was evaluated using a color difference meter (color difference meter Color Meter ZE6000, manufactured by NIPPON DENSHOKU INDUSTRIES CO., LTD.).

(2) A suspension solution (carbon black FW-200 (manufactured by Degussa AG)/deionized water=5% by mass/95% by mass) was applied by air spraying until the surface of the decorative film was uniformly masked.

(3) The decorative film was dried for one hour at 60° C. and then was left to cool to room temperature.

(4) The surface of the decorative film was washed under flowing water while dirt materials on the surface were dropped from the surface with gauze (BENCOT M-3 (manufactured by Asahi Chemical Industry Co., Ltd.)).

(5) The lightness ($L_1$) after the test was evaluated with the above-described color difference meter.

(6) The degree of contamination (lightness difference ΔL) was determined by the following formula.

Lightness difference Δ$L$=Lightness after test $L_1$−lightness before test $L_0$ <Evaluation of Chemical Resistance>

A sunscreen (NEUTROGENA (registered trademark)), a sun oil (COPPERTONE (registered trademark)), gasoline, and gasohol (90% by mass of gasoline and 10% by mass of ethanol) were dropped on the surface of a decorative film, the dropped areas were covered with cover glasses, and the decorative film was left to stand for one hour at 80° C. After standing, the dropped chemical liquids were wiped off, and the external appearance of the dropped areas was evaluated according to the following evaluation criteria.

No change in the external appearance: A
The dropped area is slightly swollen: B
Cloudiness or perforation occurs: C <Method for Measuring Thicknesses of Various Layers>

A decorative film was fixed by clamping the decorative film with small-sized metal vises, and the decorative film was cut using a single-blade knife such that a cross-section of the film became smooth. While the film was left in a state of being clamped by the vises, the film cross-section was observed at a magnification ratio of 50 times using a confocal laser microscope (VK-X110 manufactured by KEYENCE CORPORATION), and the thicknesses of the various layers were measured.

Incidentally, with regard to the fluorine-based resin layer having surface unevenness formed thereon, the vertical distance from the apex of a protrusion of the surface unevenness of the fluorine-based resin layer to the contact surface with the acrylic-based resin layer with respect to the film plane was designated as thickness.

Furthermore, also in the acrylic-based resin layer, surface unevenness is formed on the contact surface with the fluorine-based resin layer during the surface unevenness forming structure step. Therefore, also for the acrylic-based resin layer, the vertical distance from the apex of a protrusion of the surface unevenness of the acrylic-based resin layer to the contact surface with the decorative layer with respect to the film plane was designated as thickness.

<Storage Modulus>

The storage modulus of a decorative film was measured using the following measuring apparatus and under the following measurement conditions.

Measuring apparatus: Dynamic viscoelasticity measuring apparatus RSA-G2 of TA Instruments Japan Inc.
Measurement mode: Dynamic measurement mode (temperature scanning)
Measurement temperature range: 23° C. to 200° C.
Rate of temperature increase: 10° C./min
Frequency: 1 Hz
Sample shape: Strip form having a size of 30 mm in length×5 mm in width, with the flow direction of the film designated as the longitudinal direction
Distance between chucks: 10 mm

TABLE 1

| | | | | Example 1 | Example 2 | Example 3 |
|---|---|---|---|---|---|---|
| Decorative film composition | Fluorine-based resin layer | PVDF [Wt %] | KYNAR 1000HD | 90 | 100 | 80 |
| | | PMMA [Wt %] | SUMIPEX MGSS | 10 | 0 | 20 |
| | Acrylic-based resin layer | PVDF [Wt %] | KYNAR 1000HD | 5 | 5 | 5 |
| | | | KYNAR K741C | 5 | 5 | 5 |
| | | | KYNAR K720 | 10 | 10 | 10 |
| | | PMMA [Wt %] | HIPET HBS000 | 80 | 80 | 80 |
| | | Ultraviolet absorber [PHR] | TINUVIN 1577ED (triazine-based) | 3.4 | 3.4 | 3.4 |
| | | | TINUVIN 234 (benzotriazole-based) | 0 | 0 | 0 |
| | Decorative layer | PVC resin [Wt %] | S1008C | 100 | 100 | 100 |
| | | Titanium oxide [PHR] | D101 | 20 | 20 | 20 |
| Each layer thickness | Fluorine-based resin layer [μm] | | | 33 | 33 | 33 |
| | Acrylic-based resin layer [μm] | | | 17 | 17 | 17 |
| | Decorative layer [μm] | | | 200 | 200 | 200 |
| Physical property Evaluation | Storage modulus at 140° C. of fluorine-based resin layer only [dyn/cm$^2$] | | | $5.0 \times 10^7$ | $5.0 \times 10^8$ | $1.0 \times 10^7$ |
| | Heat resistance of surface unevenness [μm] | | | 20 | 20 | 18 |
| | Lamination strength of acrylic-based resin layer and decorative layer [N/15 mm] | | | 8 | 8 | 8 |
| | Value of change in 60° glossiness on fluorine-based resin layer side of decorative film after MW 480 hours | | | 10 | 5 | 15 |

TABLE 1-continued

|  |  |  |  |  |  |  |
|---|---|---|---|---|---|---|
|  | Change in yellowness Δb of decorative film after MW 480 hours |  |  |  | 1.5 | 1.5 | 1.5 |
|  | ΔL after antifouling material type I test (antifouling property) |  |  |  | −2 | −1 | −4 |
|  | Chemical resistance (80° C. × 1 hour) | NEUTROGENA |  |  | A | A | B |
|  |  | COPPERTONE |  |  | A | A | B |
|  |  | Gasoline |  |  | A | A | B |
|  |  | Gasohol (90 Wt % of gasoline + 10 Wt % of ethanol) |  |  | A | A | B |

|  |  |  |  |  | Example 4 | Example 5 | Example 6 |
|---|---|---|---|---|---|---|---|
| Decorative film composition | Fluorine-based resin layer | PVDF [Wt %] | KYNAR 1000HD |  | 80 | 90 | 90 |
|  |  | PMMA [Wt %] | SUMIPEX MGSS |  | 20 | 10 | 10 |
|  | Acrylic-based resin layer | PVDF [Wt %] | KYNAR 1000HD |  | 5 | 5 | 0 |
|  |  |  | KYNAR K741C |  | 5 | 5 | 0 |
|  |  |  | KYNAR K720 |  | 10 | 10 | 0 |
|  |  | PMMA [Wt %] | HIPET HBS000 |  | 80 | 80 | 100 |
|  |  | Ultraviolet absorber [PHR] | TINUVIN 1577ED (triazine-based) |  | 3.4 | 3.4 | 3.4 |
|  |  |  | TINUVIN 234 (benzotriazole-based) |  | 0 | 0 | 0 |
|  | Decorative layer | PVC resin [Wt %] | S1008C |  | 100 | 100 | 100 |
|  |  | Titanium oxide [PHR] | D101 |  | 20 | 20 | 20 |
| Each layer thickness | Fluorine-based resin layer [μm] |  |  |  | 10 | 200 | 33 |
|  | Acrylic-based resin layer [μm] |  |  |  | 40 | 50 | 17 |
|  | Decorative layer [μm] |  |  |  | 200 | 200 | 200 |
| Physical property Evaluation | Storage modulus at 140° C. of fluorine-based resin layer only [dyn/cm$^2$] |  |  |  | $1.0 \times 10^7$ | $5.0 \times 10^7$ | $5.0 \times 10^7$ |
|  | Heat resistance of surface unevenness [μm] |  |  |  | 16 | 20 | 20 |
|  | Lamination strength of acrylic-based resin layer and decorative layer [N/15 mm] |  |  |  | 8 | 8 | 12 |
|  | Value of change in 60° glossiness on fluorine-based resin layer side of decorative film after MW 480 hours |  |  |  | 15 | 10 | 10 |
|  | Change in yellowness Δb of decorative film after MW 480 hours |  |  |  | 0.7 | 0.5 | 1.5 |
|  | ΔL after antifouling material type I test (antifouling property) |  |  |  | −4 | −2 | −2 |
|  | Chemical resistance (80° C. × 1 hour) | NEUTROGENA |  |  | B | A | A |
|  |  | COPPERTONE |  |  | B | A | A |
|  |  | Gasoline |  |  | B | A | A |
|  |  | Gasohol (90 Wt % of gasoline + 10 Wt % of ethanol) |  |  | B | A | A |

TABLE 2

|  |  |  |  | Example 7 | Example 8 | Comparative Example 1 |
|---|---|---|---|---|---|---|
| Decorative film composition | Fluorine-based resin layer | PVDF [Wt %] | KYNAR 1000HD | 90 | 90 | 70 |
|  |  | PMMA [Wt %] | SUMIPEX MGSS | 10 | 10 | 30 |
|  | Acrylic-based resin layer | PVDF [Wt %] | KYNAR 1000HD | 35 | 5 | 5 |
|  |  |  | KYNAR K741C | 5 | 5 | 5 |
|  |  |  | KYNAR K720 | 10 | 10 | 10 |
|  |  | PMMA [Wt %] | HIPET HBS000 | 50 | 80 | 80 |
|  |  | Ultraviolet absorber [PHR] | TINUVIN 1577ED (triazine-based) | 3.4 | 0 | 3.4 |
|  |  |  | TINUVIN 234 (benzotriazole-based) | 0 | 3.4 | 0 |
|  | Decorative layer | PVC resin [Wt %] | S1008C | 100 | 100 | 100 |
|  |  | Titanium oxide [PHR] | D101 | 20 | 20 | 20 |
| Each layer thickness | Fluorine-based resin layer [μm] |  |  | 33 | 33 | 33 |
|  | Acrylic-based resin layer [μm] |  |  | 17 | 17 | 17 |
|  | Decorative layer [μm] |  |  | 200 | 200 | 200 |
| Physical property Evaluation | Storage modulus at 140° C. of fluorine-based resin layer only [dyn/cm$^2$] |  |  | $5.0 \times 10^7$ | $5.0 \times 10^7$ | $5.0 \times 10^8$ |
|  | Heat resistance of surface unevenness [μm] |  |  | 20 | 20 | 12 |
|  | Lamination strength of acrylic-based resin layer and decorative layer [N/15 mm] |  |  | 6 | 8 | 8 |
|  | Value of change in 60° glossiness on fluorine-based resin layer side of decorative film after MW 480 hours |  |  | 10 | 10 | 30 |
|  | Change in yellowness Δb of decorative film after MW 480 hours |  |  | 1.5 | 1.5 | 1.5 |
|  | ΔL after antifouling material type I test (antifouling property) |  |  | −2 | −2 | −8 |
|  | Chemical resistance (80° C. × 1 hour) | NEUTROGENA |  | A | A | C |
|  |  | COPPERTONE |  | A | A | C |
|  |  | Gasoline |  | A | A | C |
|  |  | Gasohol (90 Wt % of gasoline + 10 Wt % of ethanol) |  | A | A | C |

TABLE 2-continued

|  |  |  |  | Comparative Example 2 | Comparative Example 3 |
|---|---|---|---|---|---|
| Decorative film composition | Fluorine-based resin layer | PVDF [Wt %] | KYNAR 1000HD | 100 | 90 |
|  |  | PMMA [Wt %] | SUMIPEX MGSS | 0 | 10 |
|  | Acrylic-based resin layer | PVDF [Wt %] | KYNAR 1000HD | 5 | 45 |
|  |  |  | KYNAR K741C | 5 | 5 |
|  |  |  | KYNAR K720 | 10 | 10 |
|  |  | PMMA [Wt %] | HIPET HBS000 | 80 | 40 |
|  |  | Ultraviolet absorber [PHR] | TINUVIN 1577ED (triazine-based) | 3.4 | 3.4 |
|  |  |  | TINUVIN 234 (benzotriazole-based) | 0 | 0 |
|  | Decorative layer | PVC resin [Wt %] | S1008C | 100 | 100 |
|  |  | Titanium oxide [PHR] | D101 | 20 | 20 |
| Each layer thickness | Fluorine-based resin layer [μm] |  |  | 5 | 33 |
|  | Acrylic-based resin layer [μm] |  |  | 45 | 17 |
|  | Decorative layer [μm] |  |  | 200 | 200 |
| Physical property | Storage modulus at 140° C. of fluorine-based resin layer only [dyn/cm$^2$] |  |  | $5.0 \times 10^8$ | $5.0 \times 10^7$ |
| Evaluation | Heat resistance of surface unevenness [μm] |  |  | 10 | 20 |
|  | Lamination strength of acrylic-based resin layer and decorative layer [N/15 mm] |  |  | 8 | 2 |
|  | Value of change in 60° glossiness on fluorine-based resin layer side of decorative film after MW 480 hours |  |  | 5 | 10 |
|  | Change in yellowness Δb of decorative film after MW 480 hours |  |  | 0.7 | 1.5 |
|  | ΔL after antifouling material type I test (antifouling property) |  |  | −4 | −4 |
|  | Chemical resistance (80° C. × 1 hour) | NEUTROGENA |  | B | A |
|  |  | COPPERTONE |  | B | A |
|  |  | Gasoline |  | B | A |
|  |  | Gasohol (90 Wt % of gasoline + 10 Wt % of ethanol) |  | B | A |

As shown in Table 1 and Table 2, in the decorative films of Examples 1 to 8, the surface unevenness was satisfactorily maintained when the decorative film was heated. In addition, the decorative films of Examples 1 to 8 had excellent lamination strength between the acrylic-based resin layer and the decorative layer and were also excellent in terms of light resistance, antifouling property, and chemical resistance. On the other hand, in the decorative film of Comparative Example 1, the surface unevenness was not maintained when the film was heated. Furthermore, the decorative film of Comparative Example 1 had a large change in glossiness and poor light resistance. The decorative film of Comparative Example 1 also had poor antifouling property and chemical resistance. In the decorative film of Comparative Example 2, the surface unevenness was not maintained when the film was heated. Furthermore, the decorative film of Comparative Example 3 had poor lamination strength between the acrylic-based resin layer and the decorative layer.

From the above results, it is understood that in the decorative films according to the present invention, the surface unevenness is satisfactorily maintained when the films are heated. In addition, the decorative films according to the present invention are also excellent in terms of interlayer adhesiveness, light resistance, antifouling property, and chemical resistance.

REFERENCE SIGNS LIST

100: decorative film, 101: fluorine-based resin layer, 102: acrylic-based resin layer, 103: decorative layer.

The invention claimed is:

1. A decorative film for film insert molding, the decorative film having:
a fluorine-based resin layer containing 100 to 80 parts by mass of a fluorine-based resin and 0 to 20 parts by mass of a methacrylic acid ester-based resin;
an acrylic-based resin layer containing 50 to 0 parts by mass of a fluorine-based resin and 50 to 100 parts by mass of a methacrylic acid ester-based resin; and
a decorative layer containing a thermoplastic resin laminated therein in this order,
wherein the fluorine-based resin layer has a thickness of 10 μm to 200 μm, and
surface unevenness is formed on a surface of the fluorine-based resin layer, the surface being on the side not in contact with the acrylic-based resin layer.

2. The decorative film for film insert molding according to claim 1, wherein the acrylic-based resin layer has a thickness of 10 μm to 80 μm.

3. The decorative film for film insert molding according to claim 1, wherein a depth of the surface unevenness is 5 μm to 100 μm.

4. The decorative film for film insert molding according to claim 1, wherein a storage modulus at 140° C. of the fluorine-based resin layer is $1.0 \times 10^7$ to $1.0 \times 10^9$ dyn/cm$^2$.

5. The decorative film for film insert molding according to claim 1, wherein the fluorine-based resin included in the fluorine-based resin layer is at least one fluorine-based resin selected from the group consisting of polyvinylidene fluoride, a vinylidene fluoride-propylene hexafluoride copolymer, a vinylidene fluoride-propylene hexafluoride-ethylene tetrafluoride copolymer, an ethylene-ethylene chloride trifluoride copolymer, and an ethylene-ethylene tetrafluoride copolymer.

6. The decorative film for film insert molding according to claim 1,
wherein the acrylic-based resin layer further contains an ultraviolet absorber, and
a content of the ultraviolet absorber is 0.1 to 10 parts by mass with respect to 100 parts by mass of the sum of the mass of the fluorine-based resin and the mass of the methacrylic acid ester-based resin included in the acrylic-based resin layer.

7. The decorative film for film insert molding according to claim 6, wherein the ultraviolet absorber is a triazine-based compound or a benzotriazole-based compound.

8. The decorative film for film insert molding according to claim 1, wherein the thermoplastic resin included in the decorative layer is at least one thermoplastic resin selected from the group consisting of an acrylonitrile-butadiene-styrene copolymer, a polyvinyl chloride resin, an acrylic resin, a polycarbonate resin, and a polyurethane resin.

9. The decorative film for film insert molding according to claim 1, wherein the decorative layer further includes a colorant.

10. A part for automotive interior and exterior decoration, the part comprising the decorative film for film insert molding according to claim 1.

11. The part for automotive interior and exterior decoration according to claim 10, wherein the part for automotive interior and exterior decoration is an instrument panel part, a console part, or a pillar part for automotive interior decoration; or a side mirror cover or a bumper for automotive exterior decoration.

12. A method for manufacturing a decorative film for film insert molding, the method comprising:
   a lamination step of laminating a fluorine-based resin layer containing 100 to 80 parts by mass of a fluorine-based resin and 0 to 20 parts by mass of a methacrylic acid ester-based resin, and an acrylic-based resin layer containing 50 to 0 parts by mass of a fluorine-based resin and 50 to 100 parts by mass of a methacrylic acid ester-based resin, by a co-extrusion method;
   a pressure-bonding step of pressure-bonding, with a heating roll, a decorative layer containing a thermoplastic resin to a surface of the acrylic-based resin layer of a laminate obtained in the lamination step, the surface being on the side not in contact with the fluorine-based resin layer; and
   a surface unevenness structure forming step of pressure-bonding a surface unevenness heating roll to a surface of the fluorine-based resin layer immediately after the pressure-bonding step, the surface being on the side not in contact with the acrylic-based resin layer, and thereby forming a surface unevenness structure on the surface.

13. A molded body, having:
   a fluorine-based resin layer containing 100 to 80 parts by mass of a fluorine-based resin and 0 to 20 parts by mass of a methacrylic acid ester-based resin;
   an acrylic-based resin layer containing 50 to 0 parts by mass of a fluorine-based resin and 50 to 100 parts by mass of a methacrylic acid ester-based resin;
   a decorative layer containing a thermoplastic resin; and
   a base material layer containing a thermoplastic resin
   laminated therein in this order,
   wherein the fluorine-based resin layer has a thickness of 10 to 200 µm, and surface unevenness is formed on a surface of the fluorine-based resin layer, the surface being on the side not in contact with the acrylic-based resin layer.

14. The molded body according to claim 13, wherein the thermoplastic resin included in the base material layer is at least one thermoplastic resin selected from the group consisting of an acrylonitrile-butadiene-styrene copolymer, a polycarbonate resin, a polypropylene resin, an acrylic resin, a polyamide resin, and a polyurethane resin.

15. A method for manufacturing a molded body, the method comprising:
   a softening step of heating a decorative film for film insert molding in a mold to soften the decorative film, the decorative film having: a fluorine-based resin layer containing 100 to 80 parts by mass of a fluorine-based resin and 0 to 20 parts by mass of a methacrylic acid ester-based resin; an acrylic-based resin layer containing 50 to 0 parts by mass of a fluorine-based resin and 50 to 100 parts by mass of a methacrylic acid ester-based resin; and a decorative layer containing a thermoplastic resin, laminated therein in this order, the fluorine-based resin layer having a thickness of 10 to 200 µm, and surface unevenness being formed on a surface of the fluorine-based resin layer, the surface being on the side not in contact with the acrylic-based resin layer;
   a forming step of forming the decorative film softened in the softening step, into a final shape under vacuum pressure or with compressed air; and
   an injection step of pouring a thermoplastic resin for forming a base material layer into the mold after the forming step, cooling the thermoplastic resin to solidify, and thereby obtaining a molded body having the decorative film for film insert molding and the base material layer integrated therein.

16. A laminated film, utilized for manufacturing a decorative film for film insert molding,
   the laminated film having:
   a fluorine-based resin layer containing 100 to 80 parts by mass of a fluorine-based resin and 0 to 20 parts by mass of a methacrylic acid ester-based resin; and
   an acrylic-based resin layer containing 50 to 0 parts by mass of a fluorine-based resin and 50 to 100 parts by mass of a methacrylic acid ester-based resin,
   laminated therein, and the fluorine-based resin layer having a thickness of 10 to 200 µm,
   wherein during the manufacture of the decorative film, the decorative film is manufactured by pressure-bonding a decorative layer containing a thermoplastic resin to the laminated film with a heating roll, and immediately after the pressure-bonding, forming a surface unevenness structure on a surface of the fluorine-based resin layer, the surface being on the side not in contact with the acrylic-based resin layer, by pressure-bonding a surface unevenness heating roll to the surface.

* * * * *